US009964984B2

(12) United States Patent
Converse et al.

(10) Patent No.: US 9,964,984 B2
(45) Date of Patent: May 8, 2018

(54) SYSTEM FOR CONTROLLING LOAD SHARING

(71) Applicant: Caterpillar Inc., Peoria, IL (US)

(72) Inventors: Perry D. Converse, Lafayette, IN (US); Jeffrey A. Slabaugh, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 205 days.

(21) Appl. No.: 15/087,239

(22) Filed: Mar. 31, 2016

(65) Prior Publication Data

US 2017/0285677 A1 Oct. 5, 2017

(51) Int. Cl.
*G05F 1/66* (2006.01)
*F02D 29/06* (2006.01)
*H02P 9/04* (2006.01)

(52) U.S. Cl.
CPC .............. *G05F 1/66* (2013.01); *F02D 29/06* (2013.01); *H02P 9/04* (2013.01); *G05B 2219/39407* (2013.01)

(58) Field of Classification Search
CPC ........................................ G05B 2219/39407
USPC ................................................ 700/296
See application file for complete search history.

(56) References Cited

U.S. PATENT DOCUMENTS

| | | | | |
|---|---|---|---|---|
| 3,823,327 | A | 7/1974 | Bayer | |
| 7,710,693 | B2 | 5/2010 | Guzman-Castillas et al. | |
| 8,432,065 | B2 | 4/2013 | Reinkens | |
| 8,716,897 | B2 | 5/2014 | Algrain | |
| 9,487,284 | B2 * | 11/2016 | Crane | B63H 23/24 |
| 9,778,632 | B2 * | 10/2017 | Frampton | G05B 15/02 |
| 2010/0094490 | A1 | 4/2010 | Alston et al. | |
| 2015/0097437 | A1 | 4/2015 | Votoupal et al. | |
| 2015/0274275 | A1 | 10/2015 | Dust et al. | |
| 2016/0049891 | A1 * | 2/2016 | Frampton | H02P 9/006 322/25 |

* cited by examiner

*Primary Examiner* — Emilio J Saavedra
(74) *Attorney, Agent, or Firm* — Leydig, Voit & Mayer, Ltd.

(57) ABSTRACT

A system for allocating power generation between a constant speed generator set and a variable speed generator set. A controller determines an operating power demand from on-line consumers, and determines an anticipated transient power demand from a new consumer or one with an increasing power demand. The controller allocates the electrical power response between the generator sets to meet both the operating power demand prior to a transient condition and the total power demand upon the occurrence of the transient condition. The allocation may be based upon operating modes of the system.

20 Claims, 4 Drawing Sheets

SYSTEM FOR CONTROLLING LOAD SHARING

TECHNICAL FIELD

This disclosure relates generally to controlling load sharing within a system and, more particularly, to a system for allocating load sharing between constant speed and variable speed generator sets.

BACKGROUND

Marine vessels and other isolated power systems often include a plurality of generator sets for providing power within the system. The generator sets often include a prime mover such as an engine that is coupled to and drives an electrical generator. The generators provide power to a bus and a plurality of loads or consumers may be connected to the bus. The consumers may include any type of mechanism or system that consumes power such as propellers, thrusters, HVAC systems, lighting systems, and pumps.

Some systems may use a plurality of constant speed generator sets that operate at a constant speed. Other systems may use a plurality of variable speed generator sets that may operate within a range of speeds. Each type of generator set has its own advantages and disadvantages. For example, constant speed generator sets may be less efficient under certain operating conditions. Further, variable speed generator sets do not typically respond as quickly to transient loads as compared to constant speed generator sets.

U.S. Patent Publication No. 2015/0097437 discloses a micro-grid system with a plurality of generator sets and an energy storage unit. The generator sets may be controlled to provide power directly to the micro-power grid. Each of the generator sets may be run at a high load factor (80-85%).

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a power system for providing power to a bus includes a first generator set configured to operate at a constant speed, with the first generator set including a first prime mover and a first generator driven by the first prime mover and providing power to the bus. A second generator set is configured to operate at a variable speed, with the second generator set including a second prime mover and a second generator driven by the second prime mover and providing power to the bus. A first operating characteristic sensor is associated with the first prime mover, a second operating characteristic sensor associated is with the second prime mover, an engine speed sensor is associated with the second prime mover and is operative to determine an operating speed of the second prime mover, and a plurality of on-line consumers are operatively connected to the bus. A controller is configured to store a plurality of first maximum torque capabilities of the first prime mover, with each of the plurality of first maximum torque capabilities being based upon at least one operating characteristic of the first prime mover, store a plurality of second maximum torque capabilities of the second prime mover, with each of the plurality of second maximum torque capabilities being based upon at least one operating characteristic and the operating speed of the second prime mover, determine an operating power demand from the plurality of on-line consumers, and determine an anticipated transient power demand from a consumer, with the operating power demand and the anticipated transient power demand defining a total power demand. The controller is further configured to determine a desired first available electrical power response of the first generator and determine a desired second available electrical power response of the second generator, with the desired first available electrical power response and the desired second available electrical power response defining a desired total available electrical power response at least equal to the total power demand. Prior to a transient condition, the first generator generates a first electrical power response and the second generator generates a second electrical power response in response to the operating power demand, with the first electrical power response resulting in the first prime mover operating at a first load factor, and the second electrical power response resulting in the second prime mover operating at a second load factor. During the transient condition, the first generator generates a first transient electrical power response and the second generator generates a second transient electrical power response in response to the total power demand, with the first transient electrical power response resulting in the first prime mover operating at a first transient load factor, and the second transient electrical power response resulting in the second prime mover operating at a second transient load factor. The first load factor and the second load factor define an operating ratio, the first transient load factor and the second transient load factor define a transient ratio, and the operating ratio is different from the transient ratio. The controller is still further configured to generate first signals to control the first prime mover, with the first signals being operable to control a fuel flow rate to the first prime mover to operate the first prime mover at a desired first maximum torque capability to provide the desired first available electrical power response, and generate second signals to control the second prime mover, with the second signals being operable to control a fuel flow rate to and an operating speed of the second prime mover to operate the second prime mover at a desired second maximum torque capability to provide the desired second available electrical power response.

In another aspect, a method of providing power to a bus includes storing a plurality of first maximum torque capabilities of a first prime mover, with each of the plurality of first maximum torque capabilities being based upon at least one operating characteristic of the first prime mover, and storing a plurality of second maximum torque capabilities of a second prime mover, with each of the plurality of second maximum torque capabilities being based upon at least one operating characteristic and an operating speed of the second prime mover. The method further includes determining an operating power demand from a plurality of on-line consumers, determining an anticipated transient power demand from a consumer, with the operating power demand and the anticipated transient power demand defining a total power demand, determining a desired first available electrical power response of a first generator driven by the first prime mover, and determining a desired second available electrical power response of a second generator driven by the second prime mover. The desired first available electrical power response and the desired second available electrical power response define a desired total available electrical power response at least equal to the total power demand. Prior to a transient condition, the first generator generates a first electrical power response and the second generator generates a second electrical power response in response to the operating power demand, with the first electrical power response resulting in the first prime mover operating at a first load factor, and the second electrical power response resulting in the second prime mover operating at a second load factor. During the transient condition, the first generator generates a first transient electrical power response and the second generator generates a second transient electrical power response in response to the total power demand, with the first transient electrical power response resulting in the first prime mover operating at a first transient load factor, and the second transient electrical power response resulting in the second prime mover operating at a second transient load factor. The first load factor and the second load factor define an operating ratio, the first transient load factor and the second transient load factor define a transient ratio, and the operating ratio is different from the transient ratio. The method still further includes generating first signals to control the first prime mover, with the first signals being operable to control a fuel flow rate to the first prime mover to operate the first prime mover at a desired first maximum torque capability to provide the desired first available electrical power response, and generating second signals to control the second prime mover, with the second signals being operable to control a fuel flow rate to and an operating speed of the second prime mover to operate the second prime mover at a desired second maximum torque capability to provide the desired second available electrical power response.

In still another aspect, a system for allocating power generation of a bus between a first generator set and a second generator set includes a first operating characteristic sensor associated with the first prime mover, a second operating characteristic sensor associated with the second prime mover, an engine speed sensor associated with the second prime mover and is operative to determine an operating speed of the second prime mover, and a plurality of on-line consumers operatively connected to the bus. A controller is configured to store a plurality of first maximum torque capabilities of the first prime mover, with each of the plurality of first maximum torque capabilities being based upon at least one operating characteristic of the first prime mover, store a plurality of second maximum torque capabilities of the second prime mover, with each of the plurality of second maximum torque capabilities being based upon at least one operating characteristic and the operating speed of the second prime mover, determine an operating power demand from the plurality of on-line consumers, and determine an anticipated transient power demand from a consumer, with the operating power demand and the anticipated transient power demand defining a total power demand. The controller is further configured to determine a desired first available electrical power response of the first generator and determine a desired second available electrical power response of the second generator, with the desired first available electrical power response and the desired second available electrical power response defining a desired total available electrical power response at least equal to the total power demand. Prior to a transient condition, the first generator generates a first electrical power response and the second generator generates a second electrical power response in response to the operating power demand, with the first electrical power response resulting in the first prime mover operating at a first load factor, and the second electrical power response resulting in the second prime mover operating at a second load factor. During the transient condition, the first generator generates a first transient electrical power response and the second generator generates a second transient electrical power response in response to the total power demand, with the first transient electrical power response resulting in the first prime mover operating at a first transient load factor, and the second transient electrical power response resulting in the second prime mover operating at a second transient load factor. The first load factor and the second load factor define an operating ratio, the first transient load factor and the second transient load factor define a transient ratio, and the operating ratio is different from the transient ratio. The controller is still further configured to generate first signals to control the first prime mover, with the first signals being operable to control a fuel flow rate to the first prime mover to operate the first prime mover at a desired first maximum torque capability to provide the desired first available electrical power response, and generate second signals to control the second prime mover, with the second signals being operable to control a fuel flow rate to and an operating speed of the second prime mover to operate the second prime mover at a desired second maximum torque capability to provide the desired second available electrical power response.

DETAILED DESCRIPTION

Figure 1:
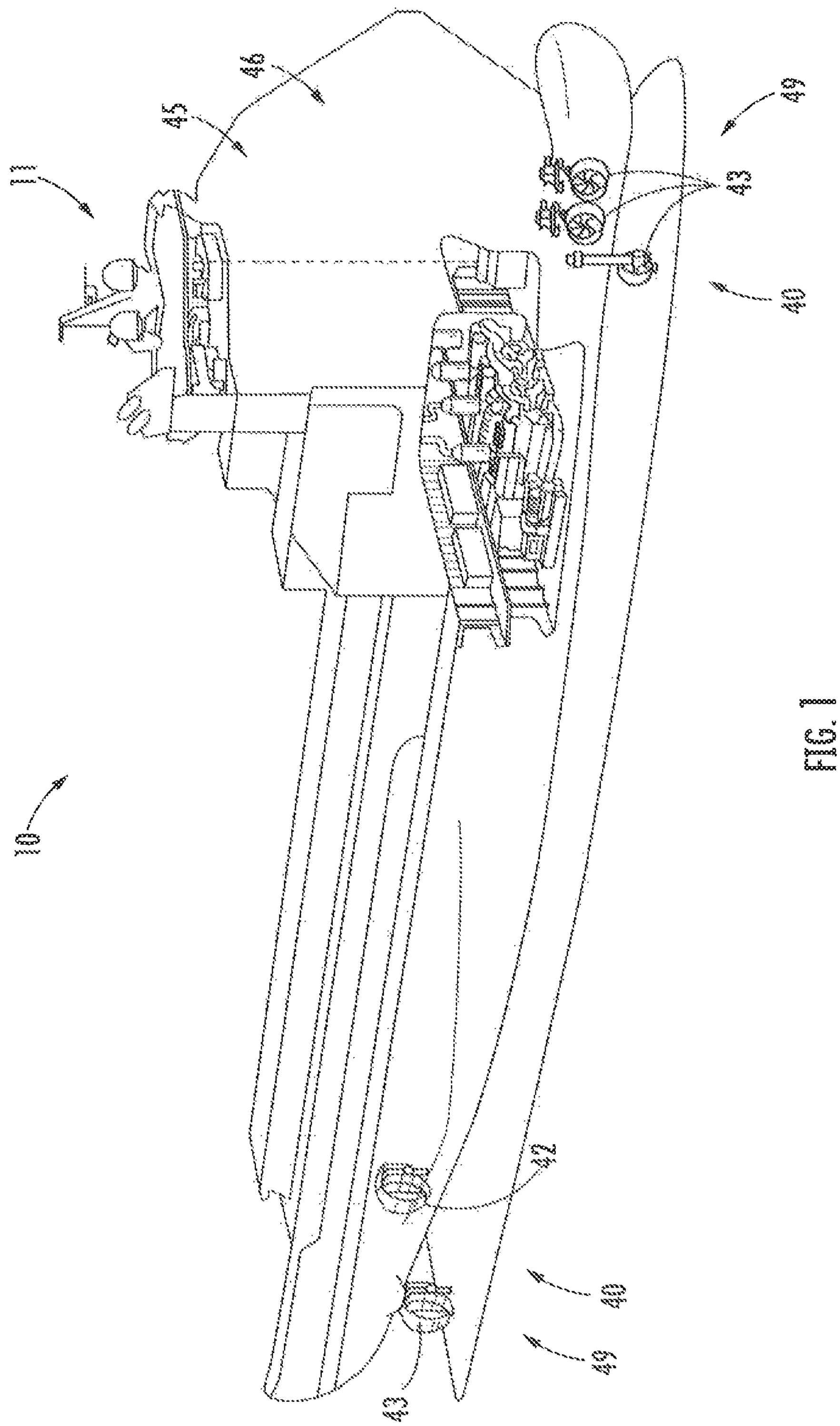
FIG. 1 depicts a diagrammatic illustration of a machine in accordance with the disclosure.

FIG. 1 illustrates a marine vessel 10 having a power system indicated generally at 20 configured to supply power to a plurality of systems or devices that operate as loads or consumers 40. Power system 20 may be controlled from a bridge 11 (or another location on-board and/or off-board vessel 10). Loads or consumers 40 may include any device or system that consumes electrical or mechanical power including motors (not shown) that drive propellers 42 of vessel 10, thrusters 43, HVAC systems, water pumps, lights, and other auxiliary systems that may be found on a marine vessel. Consumers 40 may be controlled or actuated through input devices (not shown) located at the bridge 11 or other locations on-board or off-board the vessel 10. Although depicted for use with a marine vessel 10, the power system 20 may be used in any environment including, in particular, those that are isolated from other power systems.

Power system 20 (FIG. 2) may include a plurality of generator sets indicated generally at 21 operable to generate electricity, and a power-transmission network such as a bus 41 for transferring electricity from the generator sets to the consumers 40. The generator sets 21 may comprise one or more constant speed generator sets 30 and one or more variable speed generator sets 33. Each generator set 21 may include a prime mover or engine 22 mechanically coupled or otherwise operatively connected to an electrical generator 23. Although depicted as a diesel engine, each prime mover may embody any desired form. A fuel system indicated generally at 24 is operatively connected to the engines 22 to provide fuel as necessary to provide the desired output from the engines.

Each generator 23 may be any type of electrical power producing device mechanically coupled to receive rotational power from an engine 22 and convert the mechanical power into electricity. Generator 23 may embody any type of electric machine including an AC induction generator, a permanent-magnet generator, an AC synchronous generator, or a switched-reluctance generator. In some embodiments, generator 23 may generate three-phase electrical power with an alternating current and a relatively fixed frequency and voltage. In other embodiments, the generator 23 may generate three-phase electrical power with an alternating current and a variable frequency and voltage.

Each generator 23 may be operatively connected to electrical and electronic conditioning circuitry and systems indicated generally at 25 to modify and control the electrical output from the generators as desired. Such circuitry may include rectifier systems for converting AC power into DC power. Inverter systems may be used to convert the DC power into AC power at a specified frequency and voltage.

In addition, each generator 23 may be operatively connected to a synchronization system indicated generally at 36 to control the input of electrical power onto the bus 41. The synchronization system may operate so that each generator 23 provides power to the bus 41 in phase and at the same frequency and voltage. The generator sets 21 may be operated in any desired combination to provide power to the bus 41.

The constant speed generator sets 30 may be configured to operate at a constant or relatively constant speed. In some embodiments, the constant speed may be 1500 or 1600 rpm. In some instances, the output may be a relatively constant voltage and/or frequency and the use of conditioning circuitry and systems 25 may not be necessary. The engine of the constant speed generator set 30 is depicted at 31 and the generator is depicted at 32. Synchronization system 36 may be used with the constant speed generator sets 30 to provide electrical power in phase.

The variable speed generator sets 33 may be configured to operate at any speed within a range of speeds. The output of the variable speed generator set 33 may vary in both voltage and frequency and may be dependent upon the operating speed of the generator set. The engine of the variable speed generator set 33 is depicted at 34 and the generator is depicted at 35. Conditioning circuitry and systems 25 and synchronization system 36 may be used with the variable speed generator sets 33 to provide electrical power in phase and at a desired voltage and frequency.

In some instances, the use of the conditioning circuitry and systems 25 with a variable speed generator set 33 may result in a reduced efficiency as compared to a constant speed generator set 30 in which rectification and inversion of electrical power is not required. In addition, the use of the conditioning circuitry and systems 25 as well as the synchronization system 36 may reduce the responsiveness of the variable speed generator set 33 to consumers 40 that are added to the bus 41 and result in transient loads.

Figure 2:
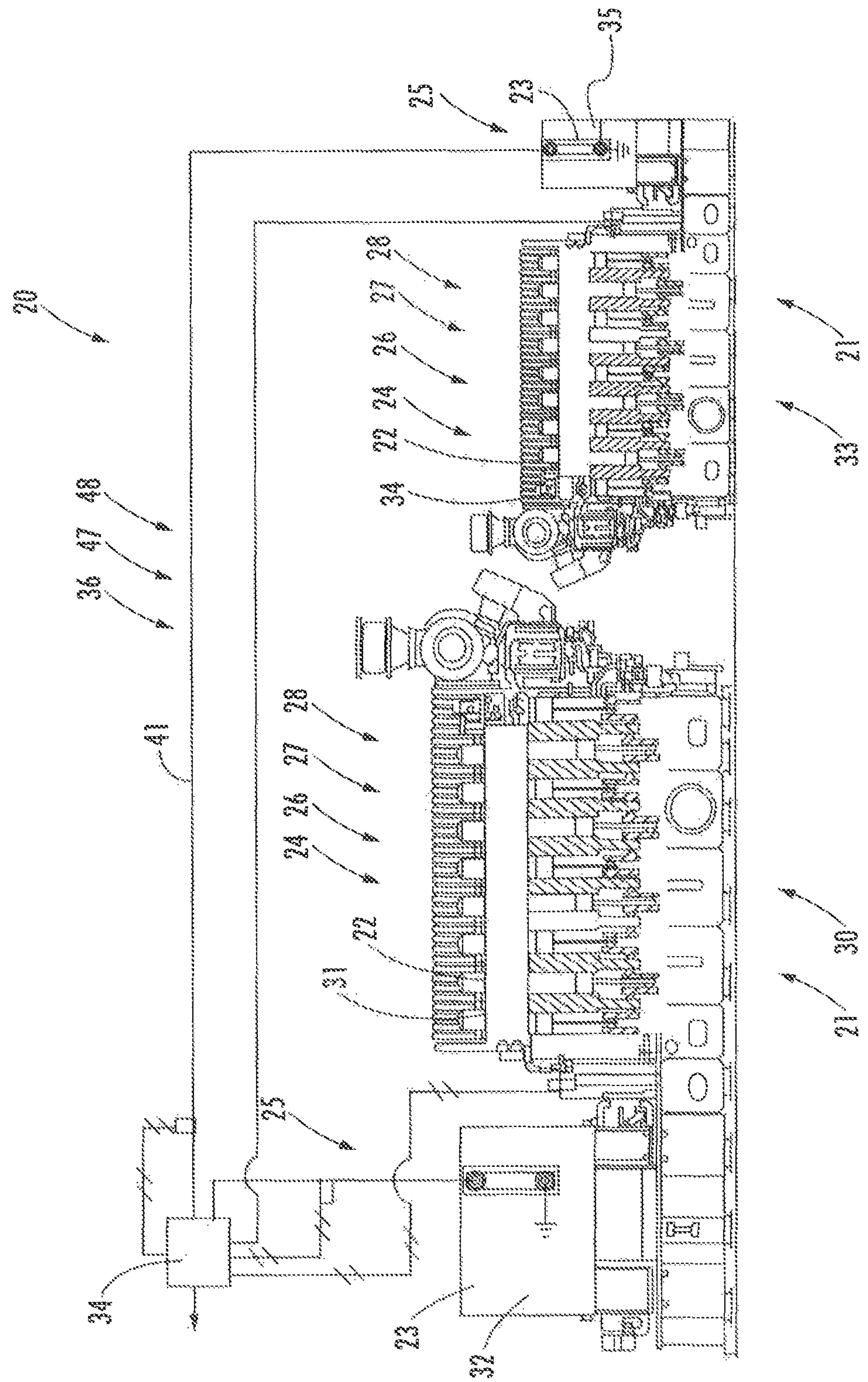
FIG. 2 depicts a diagrammatic illustration of a portion of a power system for use with the machine of FIG. 1.

While depicted in FIG. 2 with one constant speed generator set 30 and one variable speed generator set 33, the power system 20 may include any number of constant speed generator sets and variable speed generator sets. Accordingly, references herein to a constant speed generator set 30 may include one or more constant speed generator sets and references to a variable speed generator set 33 may include one or more variable speed generator sets.

Vessel 10 may be controlled by a control system 45 as shown generally by an arrow in FIG. 1 indicating association with the vessel. The control system 45 may include an electronic control module or controller indicated generally at 46 and a plurality of sensors. The controller 46 may receive input signals from an operator at the bridge 11 or elsewhere on-board or off-board the vessel 10. The controller 46 may control the operation of various aspects of the vessel 10 including propulsion, electrical, and hydraulic systems.

The controller 46 may be an electronic controller that operates in a logical fashion to perform operations, execute control algorithms, store and retrieve data and other desired operations. The controller 46 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 46 such as power supply circuitry, signal conditioning circuitry, driver circuitry, and other types of circuitry.

The controller 46 may be a single controller or may include more than one controller disposed to control various functions and/or features of the vessel 10. The term "controller" is meant to be used in its broadest sense to include one or more controllers and/or microprocessors that may be associated with the vessel 10 and that may cooperate in controlling various functions and operations of the vessel. The functionality of the controller 46 may be implemented in hardware and/or software without regard to the functionality. The controller 46 may rely on one or more data maps, relating to the operating conditions and the operating environment of the vessel 10 and its systems, which may be stored in the memory of controller. Each of these data maps may include a collection of data in the form of tables, graphs, and/or equations.

Vessel 10 may be equipped with a plurality of sensors that provide data indicative (directly or indirectly) of various operating parameters of the vessel and/or the operating environment in which the vessel is operating. The term "sensor" is meant to be used in its broadest sense to include one or more sensors and related components that may be associated with the vessel 10 and that may cooperate to sense various functions, operations, and operating characteristics of the vessel and/or aspects of the environment in which the vessel is operating.

The control system 45 may include a power generation management system 47, indicated generally by an arrow in FIG. 2, configured to monitor and control the operation of the generator sets 21 and determine the amount of power in the form of electricity being generated. The power generation management system 47 may include a plurality of sensors associated with each engine 22 to measure various conditions and operating characteristics associated with the operation of the engine. These operating characteristic sensors may include an engine temperature sensor 26, an engine speed sensor 27, and a fuel flow rate sensor 28, each of which is shown generally by an arrow in FIG. 2. The power generation management system 47 may operate to maintain the speed of the engine 22 at a desired rate. The power generation management system 47 may maintain the engine 22 at a desired speed such as by controlling the amount of fuel supplied to the engine in view of the operating conditions of the engine and anticipated load requirements.

The power generation management system 47 may also determine the instantaneous torque capability or limit of the on-line engines 22 based upon the operating conditions of the engines. In other words, the power generation management system 47 may determine the amount of torque being provided by the on-line engines 22 together with the amount of instantaneous additional torque that may be provided by the engines without materially reducing their rotational speed. A material reduction in rotational speed of an engine 22 may result in a reduction in voltage or frequency of the generator 23 being driven by the engine that exceeds a predetermined voltage or frequency drop threshold. One or more thresholds may be stored within controller 46.

The power generation management system 47 may utilize various operating characteristics of the engine 22 such as the operating speed, the engine temperature, fuel intake conditions (including fuel flow rate), and exhaust conditions together with data maps from the controller 46 to determine the maximum torque capability that may be provided by the engine 22 (i.e., the instantaneous torque limit) based upon the current operating conditions. In some instances, the power generation management system 47 may utilize engine speed and fuel consumption rate to make an accurate determination of the torque of the engine 22. The current torque together with the characteristics of the engine 22 may be used to determine the maximum torque capability as desired. In one embodiment, the combination of the engine speed sensor 27 and the fuel flow rate sensor 28 may act as an equivalent of a torque sensor for generating torque signals indicative of an output torque from the engine 22. Other manners of determining the output torque from the engine 22 are contemplated.

Based upon the maximum torque capability or instantaneous torque limit of each engine 22, the power generation management system 47 may determine the available electrical power response of the generator 23 (e.g., kW/second) that is operatively connected to the engine. The available power response for any generator 23 is generally a function of the torque of the prime mover or engine 22 driving the generator. The available power response is the amount of electrical power that may be removed or pulled from the bus 41 by loads or consumers 40 on the bus without a material reduction in the rotational speed of the engine 22 driving that generator. In one embodiment, a reduction in speed of an engine 22 that exceeds a predetermined threshold is one that results in a reduction in the rotational speed of the generator 23 associated with the engine causing a voltage drop in the output of the generator that exceeds a threshold voltage drop. In other words, a threshold rotational speed reduction of the engine 22 may be linked to a maximum desired voltage drop at the output of the generator 23.

To determine the available power response of the generator 23, the power generation management system 47 may utilize data maps within the controller 46 in view of the operating conditions of the engine 22 and the generator 23 as well as the characteristics of the engine and the generator. Other factors, such as characteristics of the bus 41 and power conversion efficiencies, may also contribute to the available power response and may be accounted for in the data maps within the controller 46.

The power generation management system 47 may control the operation of the constant speed generator sets 30 and variable speed generator sets 33 to utilize the different operating characteristics of the different types of generator sets. In many instances, it may be desirable to operate an engine 22 at a load factor between 50% and 80% in order to balance performance and fuel efficiency. In other words, operating an engine 22 within such a range of load factors provides for a reasonably high level of performance and fuel efficiency. Operating above an 80% load factor may result in increased performance but substantially worse fuel efficiency. Similarly, operating at less than a 50% load factor may result in improved fuel efficiency but substantially worse performance.

In one definition, the load factor of an engine 22 is the percentage of available torque provided by the engine as a percentage of the total available torque of the engine at a particular speed of operation. For a constant speed generator set 30, the torque and thus the output power as a result of the torque are not speed dependent. However, a variable speed generator set 33 is capable of operating within a range of speeds and may generate the same torque (and thus the same power output) at a plurality of different speeds. However, the maximum torque may vary with the speed of the engine and thus the load factor for the same torque and output power may vary based upon the operating speed of the engine.

To compare and/or analyze the operation of engines 34 of variable speed generator sets 33, it may be desirable to determine the torque provided by an engine at a particular speed of operation and compare the actual torque (or power generated by the torque) to the maximum available torque (or power generated by the torque) for the engine at its maximum or rated speed. In other words, a variable speed generator set may operate at a maximum or rated speed of 1800 rpm and generate a maximum of 1000 KW. The same variable speed generator set may operate at 900 rpm and generate a maximum of 400 KW and may operate at 1200 rpm and generate a maximum of 800 KW. In such case, the variable speed generator set may operate at a 100% load factor and generate 400 KW at 900 rpm or may operate at a 50% load factor to generate 400 KW at 1200 rpm. In both instances, the variable speed generator that may generate a maximum of 1000 KW at its rated speed of 1800 rpm is operating at a rated load factor of 40%.

The power generation management system 47 may generate electrical power by allocating the power generation, and thus control load sharing, between generator sets 21 in a desired manner to further the operational goals of the vessel 10. The generator sets 21 may be operated to meet the operating power demand from the on-line consumers as well as the anticipated transient power demand from one or more consumers that are expected to come on-line or increase in required power consumption. Additional factors that may influence the load factor of each generator set 21 may include minimum and maximum load factors. Minimum load factors may be set to avoid damage or minimize wear to the generator sets 21. Maximum load factors may be set to ensure or increase the likelihood that power is available to meet transient power demands.

More specifically, during operation, the controller 46 may determine the operating power demand from the on-line consumers 40 and determine expected or anticipated transient power demand from one or more consumers that are expected to come on-line or increase in required power consumption. The operating power demand and the anticipated transient power demand may define a total power demand. The power generation management system 47 may allocate the power generation between the constant speed generator set 30 and the variable speed generator set 33 to meet the operating power demand prior to a transient condition, and to meet the total power demand during a transient condition.

Prior to the transient condition, the constant speed generator set 30 may operate at a first load factor and the variable speed generator set 33 may operate at a second load factor. The first and second load factors may define an operating ratio. In some instances, the operating ratio may be approximately one with the first and second load factors being generally equal. Other ratios are contemplated.

During a transient condition, the additional load caused by the transient power demand may be allocated between the constant speed generator set 30 and the variable speed generator set 33 so that the constant speed generator set 30 may operate at a first transient load factor and generate a transient electrical power response and the variable speed generator set 33 may operate at a second transient load factor and also generate a transient electrical power response. The first and second transient load factors may define a transient ratio with the transient ratio being different from the operating ratio. In other words, the power generation management system 47 may be configured so that the power demand is allocated between the constant speed generator set 30 and the variable speed generator set 33 in one manner prior to a transient condition and in another manner during the transient condition.

In some instances, more of the transient power demand may be allocated to the constant speed generator set 30 rather than the variable speed generator set 33 since the constant speed generator set may respond to the transient power demand more quickly. However, after the transient power demand has been met, the power generation management system 47 may then re-allocate the power generation so that the variable speed generator set 33 gradually increases its power production. To do so, the power generation management system 47 may increase the maximum torque capability of the engine 34 of the variable speed generator set 33 and decrease the maximum torque capability of the engine 31 of the constant speed generator set 30 with the increase resulting in additional power generation capability that compensates for a decrease in power generation capability of the constant speed generator set. By reducing power generation of the constant speed generator set 30, the constant speed generator set is restored to a condition in which it has a sufficient response capability to respond to the next transient load applied to the bus 41.

The vessel 10 or power system 20 may include a plurality of modes of operation that adjust the operation of the constant speed generator sets 30 and variable speed generator sets 33. A first mode of operation of the power generation management system 47 may be referred to as a "fuel efficiency" mode. When operating in such mode, the power generation management system 47 may operate to minimize the amount of fuel used to generate a particular load. To do so, the power generation management system 47 may maximize the load factor of each engine 22 to generate the total desired electrical power response. As a result, the engine 31 of the constant speed generator set 30 may be operated at as high a load factor as possible while the engine 34 of the variable speed generator set 33 is also operated at as high a load factor as possible. To operate the engine 34 of the variable speed generator set 33 at a high load factor while the engine 31 of the constant speed generator set 30 is also operated at a high load factor, the power generation management system 47 may be configured to run the engine 34 at a relatively low speed. In such mode of operation, the power generation management system 47 may not be optimized to respond to transient loads on the bus 41. In one example, the constant speed generator set 30 may operate within a load factor range between 50%-100% and the variable speed generator set 33 may operate within a rated load factor range between 0-50%.

A second mode of operation of power generation management system 47 may be referred to as a "performance" mode. When operating in such a mode, the power generation management system 47 may operate with the constant speed generator set 30 at as low a load factor as possible while maintaining the desired response capability for transient power demands. The variable speed generator set 33 may be operated at a relatively high rated load factor so that a desired torque response is available. In one example, the constant speed generator set 30 may operate within a load factor range between 30%-70% and the variable speed generator set 33 may operate within a rated load factor range between 40%-80%.

A third mode of operation of power generation management system 47 may be referred to as an "emissions" mode. When operating in such a mode, the power generation management system 47 may control the constant speed generator set 30 and the variable speed generator set 33 to operate at a load factor that is sufficiently high to create exhaust gas temperatures over a desired threshold. In such case, it may be desirable to operate both the constant speed generator set 30 and the variable speed generator set 33 within a load factor range between 40%-80% and with the rated load factor range of the variable speed generator set between 20%-100%.

A fourth mode of operation of power generation management system 47 may be referred to as a "maintenance" mode. When operating in such a mode, the power generation management system 47 may control the constant speed generator set 30 and the variable speed generator set 33 so that the constant speed generator set operates within a relatively narrow load factor range to minimize changes in load on the constant speed generator set. In doing so, the variable speed generator set 33 may be operated so that changes in load are primarily handled by the variable speed generator set. In one example, the constant speed generator set 30 may operate within a load factor range between 50%-80% and the variable speed generator set 33 may operate within a rated load factor range between 0-100%.

The power system 20 may include a plurality of generator sets 21 and, at times, one or more of the generator sets may not be operating. References herein to operating characteristics and performance exclude such non-operating engines 22 and generators 23. For example, a reference to the maximum torque capabilities of engines 22 refers to the engines that are operating on-line and connected to an operating generator 23. Similarly, a plurality of consumers 40 may be connected to bus 41. However, such consumers 40 may only operate as loads on the bus 41 when they are operating or are operatively connected such as when a vessel operator or a system has provided instructions to operate such consumers.

The control system 45 may include a load management system 48, indicated generally by an arrow in FIG. 2, configured to monitor the loads of the consumers 40 operatively connected to the bus 41. The load management system 48 may also control current to the consumers 40, and in some instances, prioritize the current flow to the consumers. The load management system 48 may include a load sensor 49 associated with one or more consumers 40 to measure the electrical load on the bus 41 as a result of the consumers.

The controller 46 may include or have stored therein data maps indicative of the maximum electrical load required or that may be pulled for each consumer 40. It should be noted that some consumers 40 may require a full electrical load to operate while others may be variable load consumers that may be operated at less than their full load. For example, an HVAC system may require a full electrical load or power while thrusters may be operated with less than full power. In such case, the HVAC system may be inoperative unless running at full power while the thrusters may merely operate at a lower rotational rate in case of reduced power. The operability of a consumer 40 at less than a full load may also be stored within the data maps.

Absent operating constraints or constraining systems, engagement of an input device (not shown) to actuate a consumer 40 will typically increase the electrical load on the bus 41. If the on-line engines 22 are operating at or near their maximum torque capability, adding such a consumer 40 may draw too much instantaneous power. Attempting to draw more power than is available may cause a voltage drop and a resulting increase in current, which may cause a circuit breaker to trip.

Figure 3:
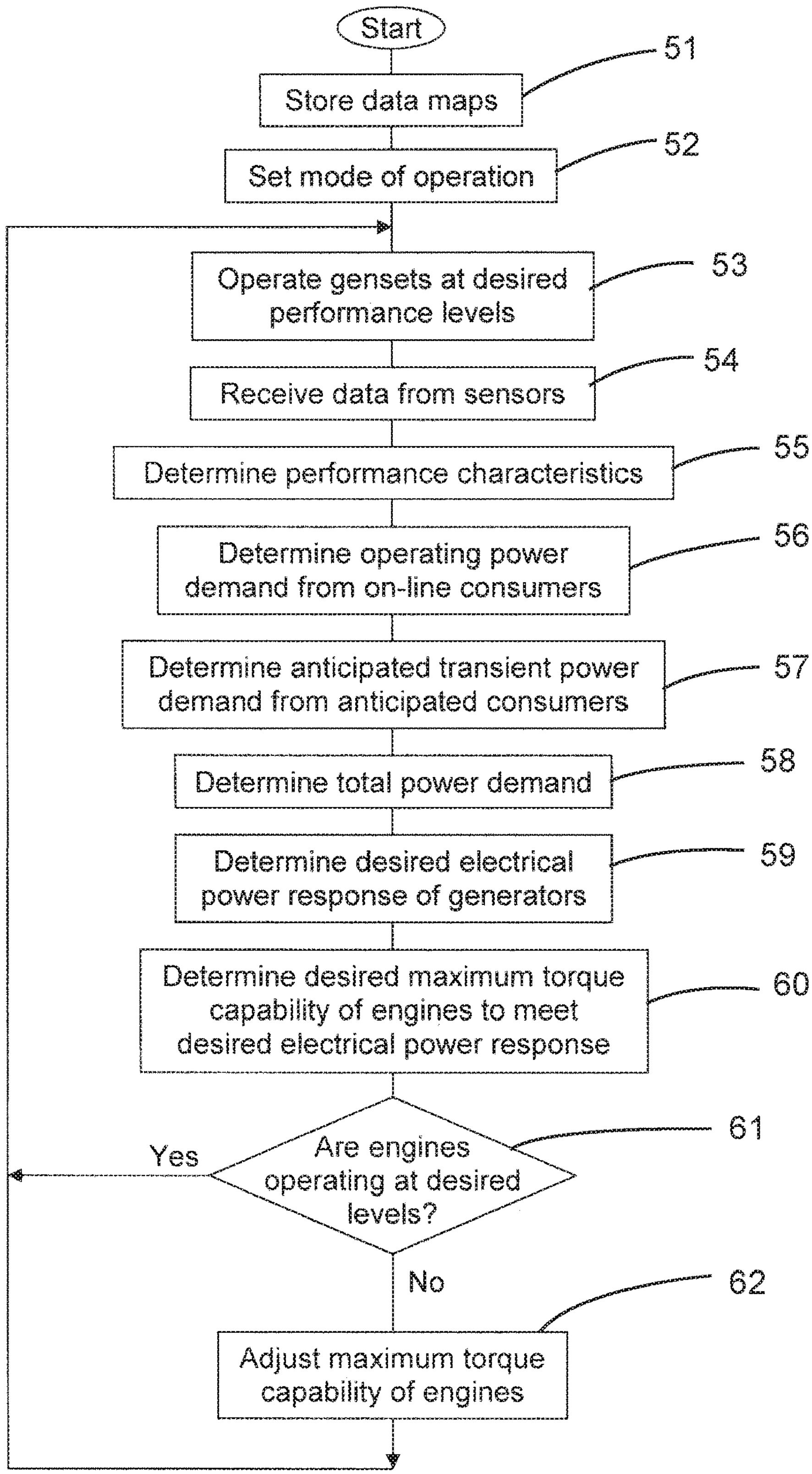
FIG. 3 depicts a flowchart illustrating a process for controlling the electrical power response of constant speed generator sets and variable speed generator sets.

The flowchart in FIG. 3 depicts the operation of the power system 20 with a plurality of consumers 40 operatively connected to the power system. At stage 51, data maps of the characteristics and performance of the power system 20 including the engines 22 and the generators 23 may be stored within controller 46. These data maps may include maximum torque capabilities or limits of the engines 22 based upon the operating conditions of the engines as well as the available power response of the generators 23. In addition, the data maps may include desired power or torque allocations between the constant speed generator sets 30 and variable speed generator sets 33 based upon desired allocation factors such as various modes of operation of the vessel 10 or power system 20.

The data maps may also include the characteristics and performance as well as the maximum power demand of each consumer 40 that may be operatively connected to the bus 41. In addition, the data maps may also store whether each consumer may be operated at less than full load and the relative priority of the operation of the consumers.

At stage 52, a mode of operation of the vessel 10 or the power system 20 may be set or chosen by an operator or system of the vessel. In some instances, a default mode may be established within the power generation management system 47 and alternate modes set or chosen by an operator or system.

The vessel 10 may be operated at stage 53 with the engines 22 and the generators 23 operating at desired performance levels. For example, the constant speed generator sets 30 are configured to operate at a constant speed and voltage and the variable speed generator sets 33 may be operated at another speed and voltage. At stage 54, data from the sensors on the vessel 10 may be received by controller 46. In particular, data may be received by controller 46 from the engine speed sensor 27, the fuel flow rate sensor 28, as well as load sensors 49 associated with the consumers 40. The controller 46 may determine certain performance characteristics at stage 55 such as the speed of each engine 22 based upon the data from the engine speed sensor 27 associated with each engine and further may determine the fuel consumption or flow rate for each engine based upon the data from the fuel flow rate sensor 28 associated with each engine.

At stage 56, the load management system 48 may determine the load or power demand of the consumers 40 that are operating on the bus 41. To do so, the load management system 48 may utilize one or more load sensors 49 to determine which consumers 40 are on-line and/or the load or power demand of the on-line consumers 40. Other manners of determining or estimating the load or power demand of the on-line consumers 40 are contemplated.

At stage 57, the load management system 48 or other aspects of control system 45 may determine an anticipated transient power demand from one or more consumers that may be brought on-line. In one embodiment, the anticipated transient power demand may be set as a constant value based upon activities or actions being performed on or by the vessel. In another embodiment, the anticipated transient power demand may be set based upon activities or actions that are anticipated to be performed on or by the vessel. In still another embodiment, the anticipated transient power demand may be set based upon a percentage of the current load on or power demand of the bus 41. In any of these instances, the anticipated transient power demand may be also based upon the mode of operation of the vessel 10 or power system 20.

For example, when operating to maintain the vessel 10 in a specific location such as against an oil rig, it may be necessary to utilize "heavy" consumers such as thrusters 43. Accordingly, it may be anticipated that a large transient load may be placed onto the bus 41. In another example, the vessel 10 may be operating in an environment in which only relatively small loads are anticipated to be added to the bus 41. In any case, it is typically desirable to operate the generator sets 21 so that they have sufficient response capability to respond to the expected transient loads added to the bus 41.

In addition, the ability of the generator sets 21 and the bus 41 to respond to a transient load may also be dependent upon the mode of operation of the vessel 10 or power system 20. For example, when operating in performance mode, it may be desirable to anticipate the largest possible transient load. However, when operating in a fuel efficiency mode, it may be desirable to anticipate a smaller transient load or a transient load that is more likely to be brought onto the bus 41.

The controller 46 or load management system 48 may add or sum the operating power demand from the on-line consumers 40 and the anticipated transient power demand from anticipated consumers that may be brought onto the bus 41 to determine or define at stage 58 a total power demand for the bus. Such total power demand may operate as a target for the power generation management system 47. Accordingly, at stage 59, the power generation management system 47 may determine the desired electrical power response from the generators 32 of the constant speed generator sets 30 and the electrical power response from the generators 35 of the variable speed generator sets 33.

More specifically, since the constant speed generator sets 30 and the variable speed generator sets 33 and their related systems such as the conditioning circuitry and systems 25 and the synchronization system 36 have different operating characteristics (e.g., response time, efficiency), the power generation management system 47 may rely upon data maps within controller 46 to determine a desired allocation for the generation of electrical power by the constant speed generator sets 30 and the variable speed generator sets 33. For example, when operating in performance mode, the power generation management system 47 may allocate more desired electrical power response to the variable speed generator sets 33 as compared to the constant speed generator sets 30. Such allocation may ensure or improve the likelihood that the total power demand is met at the expense of other aspects of system performance such as fuel efficiency. In other modes, the power generation management system 47 may allocate the desired electrical power response differently between the constant speed generator sets 30 and the variable speed generator sets 33.

In addition to being based upon the operating mode, the data maps may also be based upon the magnitude of the total power demand. For example, the desired electrical power response of the constant speed generator sets 30 and the variable speed generator sets 33 may be allocated differently for a smaller total power demand as compared to a larger total power demand.

Based upon the desired electrical power response of each of the constant speed generator sets 30 in the variable speed generator set 33, the power generation management system 47 may determine at stage 60 the desired maximum torque capability required for the desired electrical power response. In the case of the constant speed generator set 30, the desired maximum torque capability may be based upon the fuel consumption of the engine 31 and the fixed speed of operation of the generator set. In the case of the variable speed generator set 33, the desired maximum torque capability may be based on the fuel consumption of the engine 34 and an operating speed of the generator set as selected by the power generation management system 47 so that the system performs in a desired manner.

At decision stage 61, the power generation management system 47 may compare desired maximum torque capability of each engine 22 to its actual maximum torque capability based upon its fuel consumption and operating speed. If an engine 22 is operating at the desired level, the engine 22 may continue to operate without change and stages 53-62 repeated. If an engine 22 is not operating at the desired level, the power generation management system 47 may adjust at stage 62 the maximum torque capability of the engine 22 so that it is at the desired level. When adjusting the maximum torque capability of the engine 31 of the constant speed generator set 30, the power generation management system 47 may adjust the fuel consumption or usage rate. When adjusting the maximum torque capability of the engine 34 of the variable speed generator set 33, the power generation management system 47 may adjust the fuel consumption or usage rate and/or the operating speed of the engine. After adjusting the engines 22 to the desired torque capability, stages 53-62 may be repeated.

Figure 4:
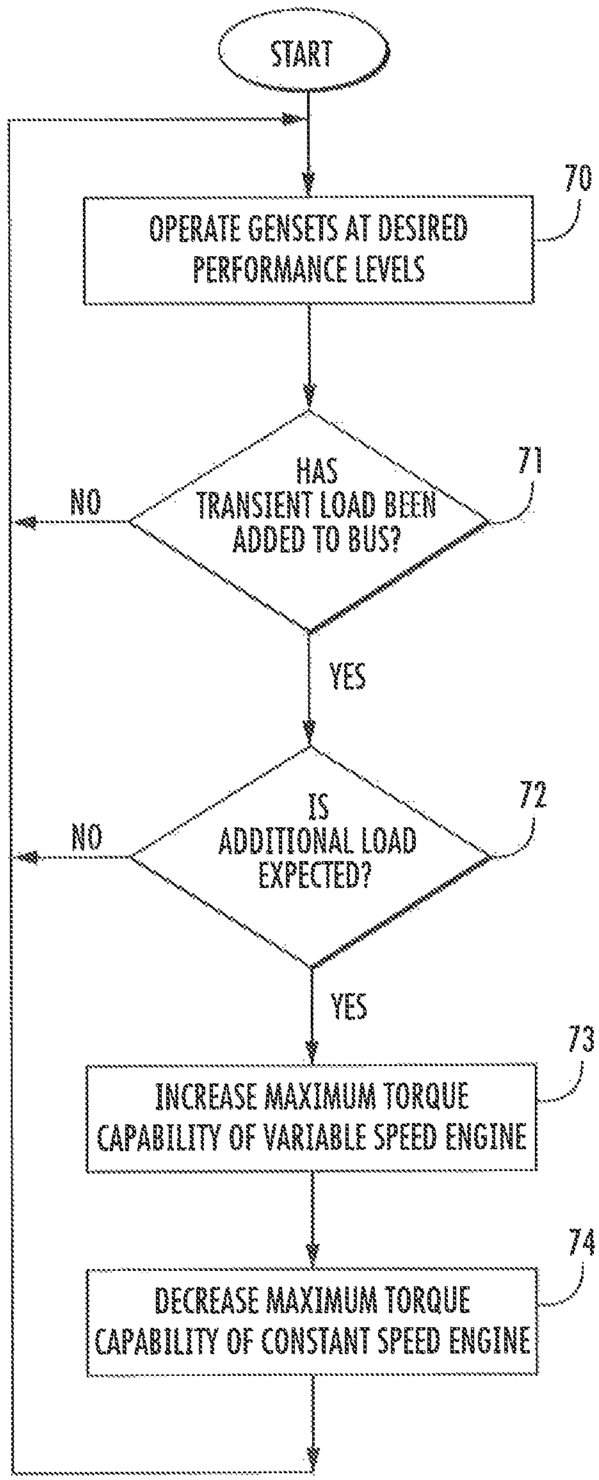
FIG. 4 depicts a flowchart illustrating a process for controlling the electrical power response of constant speed generator sets and variable speed generator sets in response to the addition of a transient load to a bus.

The flowchart in FIG. 4 depicts the operation of the power system 20 upon bringing a transient load onto bus 41. At stage 70, the vessel 10 may be operated with the engines 22 and generators 23 operating at their desired performance levels as described above with respect to FIG. 3 including stages 51-62. At decision stage 71, the controller 46 or load management system 48 may determine whether a transient load has been added to the bus 41. If a transient load has not been added, the power generation management system 47 may continue to operate at stages 71-72.

If a transient load has been added, the controller 46 may determine whether an additional or new load is expected to be placed onto the bus 41. If an additional load is not expected to be placed onto the bus 41, the power generation management system 47 may continue to operate at stages 71-73. If an additional load is expected to be placed onto the bus 41, the power generation management system 47 may adjust the operation of the generator sets 21 to prepare for the additional load by providing sufficient response capability. More specifically, at stage 73, the maximum torque capability of the engine 34 of the variable speed generator set 33 may be increased and, at stage 74, the maximum torque capability of the engine 31 on the constant speed generator set 30 may be decreased. Stages 70-74 may then be repeated.

INDUSTRIAL APPLICABILITY

The industrial applicability of the system described herein will be readily appreciated from the forgoing discussion. The foregoing discussion is applicable to power systems 20 used with marine vessels and other isolated power systems. Such power systems 20 include one or more constant speed generator sets 30 and one or more variable speed generator sets 33, with each generator set including a prime mover that drives a generator.

A control system 45 may include a power generation management system 47 to monitor and control the operation of the generator sets 21. Based upon the operating power demand from the on-line consumers and the anticipated transient power demand from additional consumers that may come on-line or on-line consumers that require additional power, a total power demand may be determined. The power generation management system 47 may operate to allocate the electrical power response between the constant speed generator sets 30 and the variable speed generator sets 33 so that the operating power demand is met and the power system 20 is prepared to respond to transient loads that are added to the bus 41. The allocation of electrical power response may be based upon any of a plurality of factors.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A power system for providing power to a bus, comprising:

a first generator set configured to operate at a constant speed, the first generator set including a first prime mover and a first generator driven by the first prime mover, the first generator providing power to the bus;

a first operating characteristic sensor associated with the first prime mover;

a second generator set configured to operate at a variable speed, the second generator set including a second prime mover and a second generator driven by the second prime mover, the second generator providing power to the bus;

a second operating characteristic sensor associated with the second prime mover;

an engine speed sensor associated with the second prime mover, the engine speed sensor being operative to determine an operating speed of the second prime mover;

a plurality of on-line consumers operatively connected to the bus; and a controller configured to:

store a plurality of first maximum torque capabilities of the first prime mover, each of the plurality of first maximum torque capabilities being based upon at least one operating characteristic of the first prime mover;

store a plurality of second maximum torque capabilities of the second prime mover, each of the plurality of second maximum torque capabilities being based upon at least one operating characteristic and the operating speed of the second prime mover;

determine an operating power demand from the plurality of on-line consumers;

determine an anticipated transient power demand from a consumer, wherein the combination of the operating power demand and the anticipated transient power demand is a total power demand;

determine a desired first available electrical power response of the first generator;

determine a desired second available electrical power response of the second generator;

generate first signals to control the first prime mover, the first signals being operable to control a fuel flow rate to the first prime mover to operate the first prime mover at a desired first maximum torque capability to provide the desired first available electrical power response; and generate second signals to control the second prime mover, the second signals being operable to control a fuel flow rate to and an operating speed of the second prime mover to operate the second prime mover at a desired second maximum torque capability to provide the desired second available electrical power response;

and wherein:

the desired first available electrical power response and the desired second available electrical power response provide a desired total available electrical power response that is at least equal to the total power demand;

prior to a transient condition, the first generator generates a first electrical power response and the second generator generates a second electrical power response in response to the operating power demand, such that the first electrical power response results in the first prime mover operating at a first load factor and the second electrical power response results in the second prime mover operating at a second rated load factor, the first load factor and the second rated load factor form an operating ratio; and during the transient condition, the first generator generates a first transient electrical power response and the second generator generates a second transient electrical power response in response to the total power demand, such that the first transient electrical power response results in the first prime mover operating at a first transient load factor, and the second transient electrical power response results in the second prime mover operating at a second transient rated load factor, where the first transient load factor and the second transient rated load factor form a transient ratio, the operating ratio being different from the transient ratio.

2. The power system of claim 1, wherein the controller is further configured to determine a mode of operation of the power system and the first load factor and the second rated load factor are based upon the mode of operation of the power system.

3. The power system of claim 2, wherein the power system is configured to operate in a first mode of operation and a range of the first load factor is between 50%-100% and a range of the second rated load factor is between 0-50%.

4. The power system of claim 2, wherein the power system is configured to operate in a second mode of operation and a range of the first load factor is between 30%-70% and a range of the second rated load factor is between 40%-80%.

5. The power system of claim 2, wherein the power system is configured to operate in a third mode of operation and a range of the first load factor is between 40%-80% and a range of the second rated load factor is between 20%-100%.

6. The power system of claim 2, wherein the power system is configured to operate in a fourth mode of operation and a range of the first load factor is between 50%-80% and a range of the second rated load factor is between 0-100%.

7. The power system of claim 2, wherein the first rated torque capability is greater than the second rated torque capability.

8. The power system of claim 1, including a fuel flow rate sensor operatively associated with the first prime mover for determining a fuel flow rate to the first prime mover and the at least one operating characteristic of the first prime mover includes the fuel flow rate to first prime mover; and further including a fuel flow rate sensor and an engine speed sensor each being operatively associated with the second prime mover, the fuel flow rate sensor being operative to determining a fuel flow rate to the second prime mover and the engine speed sensor being operative to determine an operating speed of the second prime mover, the at least one operating characteristic of the second prime mover includes the fuel flow rate to the first prime mover and the operating speed of the second prime mover.

9. The power system of claim 1, wherein the controller is further configured to increase the desired first maximum torque capability of the first prime mover upon an increase in load on the bus.

10. The power system of claim 9, wherein the controller is further configured to subsequently decrease the desired first maximum torque capability and increase the desired second maximum torque capability, the increase in the desired second maximum torque capability of the second prime mover compensating for the decrease in the desired first maximum torque capability of the first prime mover.

11. The power system of claim 10, wherein the controller is further configured to increase a fuel flow rate to the first prime mover to increase the desired first maximum torque capability.

12. The power system of claim 1, wherein the first prime mover and the second prime mover are engines.

13. The power system of claim 1, wherein the first generator set and the second generator set are on-board a marine vessel.

14. The power system of claim 1, further including a load sensor to measure an electrical load on the bus, and the operating power demand is based upon signals from the load sensor.

15. A method of providing power to a bus, comprising:
storing a plurality of first maximum torque capabilities of a first prime mover, each of the plurality of first maximum torque capabilities being based upon at least one operating characteristic of the first prime mover;
storing a plurality of second maximum torque capabilities of a second prime mover, each of the plurality of second maximum torque capabilities being based upon at least one operating characteristic and an operating speed of the second prime mover;
determining an operating power demand from a plurality of on-line consumers; determining an anticipated transient power demand from a consumer, wherein the combination of the operating power demand and the anticipated transient power demand is a total power demand;
determining a desired first available electrical power response of a constant speed first generator driven by the first prime mover;
determining a desired second available electrical power response of a variable speed second generator driven by the second prime mover;
generating first signals to control the first prime mover, the first signals being operable to control a fuel flow rate to the first prime mover to operate the first prime mover at a desired first maximum torque capability to provide the desired first available electrical power response; and
generating second signals to control the second prime mover, the second signals being operable to control a fuel flow rate to and an operating speed of the second prime mover to operate the second prime mover at a desired second maximum torque capability to provide the desired second available electrical power response;
and wherein:
the desired first available electrical power response and the desired second available electrical power response provide a desired total available electrical power response that is at least equal to the total power demand;
prior to a transient condition, the first generator generating a first electrical power response and the second generator generating a second electrical power response in response to the operating power demand, such that the first electrical power response results in the first prime mover operating at a first load factor and the second electrical power response results in the second prime mover operating at a second rated load factor, the first load factor and the second rated load factor form an operating ratio; and
during the transient condition, the first generator generating a first transient electrical power response and the second generator generating a second transient electrical power response in response to the total power demand, such that the first transient electrical power response results in the first prime mover operating at a first transient load factor and the second transient electrical power response results in the second prime mover operating at a second transient rated load factor, where the first transient load factor and the second transient rated load factor form a transient ratio, the operating ratio being different from the transient ratio.

16. The method of claim 15, further including determining a mode of operation of the power system and the first load factor and the second rated load factor are based upon the mode of operation of the power system.

17. The method of claim 16, further including operating the power system in a first mode of operation with a range of the first load factor between 50%-100% and a range of the second rated load factor range between 0-50%.

18. The method of claim 15, further including increasing the desired first maximum torque capability of the first prime mover upon an increase in load on the bus.

19. The method of claim 18, further including subsequently decreasing the desired first maximum torque capability and increasing the desired second maximum torque capability, the increase in the desired second maximum torque capability of the second prime mover compensating for the decrease in the desired first maximum torque capability of the first prime mover.

20. A system for allocating power generation of a bus between a first generator set and a second generator set, the first generator set being configured to operate at a constant speed, the first generator set including a first prime mover and a first generator driven by the first prime mover, the first generator providing power to the bus, the second generator set being configured to operate at a variable speed, the second generator set including a second prime mover and a second generator driven by the second prime mover, the second generator providing power to the bus, the system comprising:
a first operating characteristic sensor associated with the first prime mover;
a second operating characteristic sensor associated with the second prime mover;
an engine speed sensor associated with the second prime mover, the engine speed sensor being operative to determine an operating speed of the second prime mover;
a plurality of on-line consumers operatively connected to the bus; and
a controller configured to:
store a plurality of first maximum torque capabilities of the first prime mover, each of the plurality of first maximum torque capabilities being based upon at least one operating characteristic of the first prime mover;
store a plurality of second maximum torque capabilities of the second prime mover, each of the plurality of second maximum torque capabilities being based upon at least one operating characteristic and the operating speed of the second prime mover;
determine an operating power demand from the plurality of on-line consumers;
determine an anticipated transient power demand from a consumer, wherein the combination of the operating power demand and the anticipated transient power demand is a total power demand;
determine a desired first available electrical power response of the first generator; determine a desired second available electrical power response of the second generator;
generate first signals to control the first prime mover, the first signals being operable to control a fuel flow rate to the first prime mover to operate the first prime mover at a desired first maximum torque capability to provide the desired first available electrical power response; and
generate second signals to control the second prime mover, the second signals being operable to control a fuel flow rate to and an operating speed of the second prime mover to operate the second prime mover at a desired second maximum torque capability to provide the desired second available electrical power response;

and wherein:

the desired first available electrical power response and the desired second available electrical power response provide a desired total available electrical power response that is at least equal to the total power demand;

prior to a transient condition, the first generator generates a first electrical power response and the second generator generates a second electrical power response in response to the operating power demand, such that the first electrical power response results in the first prime mover operating at a first load factor and the second electrical power response results in the second prime mover operating at a second rated load factor, the first load factor and the second rated load factor form an operating ratio; and during the transient condition, the first generator generates a first transient electrical power response and the second generator generates a second transient electrical power response in response to the total power demand, such that the first transient electrical power response results in the first prime mover operating at a first transient load factor, and the second transient electrical power response results in the second prime mover operating at a second transient rated load factor, where the first transient load factor and the second transient rated load factor form a transient ratio, the operating ratio being different from the transient ratio.

* * * * *